United States Patent
Yoshimura et al.

(10) Patent No.: US 11,097,510 B2
(45) Date of Patent: Aug. 24, 2021

(54) LAMINATE

(71) Applicant: TOYOBO FILM SOLUTIONS LIMITED, Tokyo (JP)

(72) Inventors: Tomoka Yoshimura, Tokyo (JP); Ai Koganemaru, Tokyo (JP); Mitsuo Tojo, Tokyo (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/650,149

(22) PCT Filed: Oct. 15, 2018

(86) PCT No.: PCT/JP2018/038243
§ 371 (c)(1),
(2) Date: Mar. 24, 2020

(87) PCT Pub. No.: WO2019/078134
PCT Pub. Date: Apr. 25, 2019

(65) Prior Publication Data
US 2020/0282701 A1    Sep. 10, 2020

(30) Foreign Application Priority Data
Oct. 17, 2017    (JP) ............................. JP2017-201090

(51) Int. Cl.
*B32B 27/32* (2006.01)
*B32B 7/12* (2006.01)
*C09J 11/06* (2006.01)
*C09J 133/14* (2006.01)

(52) U.S. Cl.
CPC ............. *B32B 7/12* (2013.01); *B32B 27/32* (2013.01); *C09J 11/06* (2013.01); *C09J 133/14* (2013.01); *B32B 2255/10* (2013.01); *B32B 2255/26* (2013.01); *B32B 2262/0246* (2013.01); *B32B 2262/0276* (2013.01); *B32B 2307/304* (2013.01); *B32B 2307/31* (2013.01)

(58) Field of Classification Search
CPC ....... B32B 27/308; B32B 27/32; B32B 27/36; C08F 22/00; C08F 22/10; C08F 22/20; C08F 122/00; C08F 122/10; C08F 122/20; C08F 222/00; C08F 222/10; C08F 222/12; C08F 222/20; C08L 33/00; C08L 33/04; C08L 33/14; C09J 133/00; C09J 133/04; C09J 133/14
See application file for complete search history.

(56) References Cited

U.S. PATENT DOCUMENTS

| | | | |
|---|---|---|---|
| 2003/0134097 A1* | 7/2003 | Prasad | B41J 2/17513 428/212 |
| 2019/0001634 A1 | 1/2019 | Takei et al. | |

FOREIGN PATENT DOCUMENTS

| | | |
|---|---|---|
| JP | H02-248435 A | 10/1990 |
| WO | 2017/037525 A1 | 3/2017 |

OTHER PUBLICATIONS

European Patent Office, Extended European Search Report in European Patent Application No. 18867795.9 dated (Nov. 6, 2020).
Japanese Patent Office, International Search Report in International Patent Application No. PCT/JP2018/038243 dated (Dec. 11, 2018).

* cited by examiner

*Primary Examiner* — Zachary M Davis
(74) *Attorney, Agent, or Firm* — Leydig, Voit & Mayer, Ltd.

(57) ABSTRACT

A laminate having an easy-to-adhere layer on at least one face of a resin substrate film, and having a heat seal layer on a face, of at least one of the easy-to-adhere layer(s), which is on a side opposite the resin substrate film, wherein the resin substrate film has a glass transition temperature of not less than 90° C.; the easy-to-adhere layer is formed from easy-to-adhere agent containing 100 parts by weight of acrylic polymer resin and 3-40 parts by weight of crosslinking agent; the acrylic polymer resin has methylol groups in an amount of 7-20 mol % of all monomer units that make up this polymer; the crosslinking agent is at least one crosslinking agent selected from oxazoline-type crosslinking agents and glycidylamine-type crosslinking agents; and the heat seal layer is a polyolefin-type heat seal layer with a thickness of less than 300 μm.

4 Claims, No Drawings

LAMINATE

CROSS-REFERENCE TO RELATED APPLICATIONS

This patent application is the U.S. national phase of International Patent Application No. PCT/JP2018/038243, filed Oct. 15, 2018, which claims the benefit of Japanese Patent Application No. 2017-201090, filed on Oct. 17, 2017, which are incorporated by reference in their entireties herein.

TECHNICAL FIELD

The present disclosure relates to a laminate having heat seal layer(s).

BACKGROUND ART

A film or sheet having heat seal characteristics is such that a thermally fusible heat seal layer is provided at a surfacemost face on at least one side of a substrate therein, heat seal layers being affixed to each other and used for packaging, or being affixed to metal and/or resin and so forth for use in any of various roles. As substrate, while the selection thereof depends on the purpose to which it will be put, there are many situations in which resin substrate is employed, polyester film in particular often being employed where the properties thereof—which include mechanical strength, dimensional stability, heat resistance, transparency, chemical resistance, aroma retention, and so forth—are to be exploited.

To obtain excellent adhesive force, not only is there a need for adhesive force between the heat seal layer and the object to which it will be bonded, but there is also a need for there to be excellent adhesive force between the substrate and the heat seal layer. To obtain excellent adhesive force between a substrate and a heat seal layer or other such functional layer which is to be provided thereon, causing the surface of the substrate to undergo corona treatment, plasma treatment, or the like to achieve activation thereof, and causing the surface of the substrate to be provided with an easy-to-adhere layer, are known.

Patent Reference No. 1 has a description to the effect that adhesive force with respect to diazo photosensitive paint may be improved by causing a primer layer in which a glycidylamine compound has been used to cause crosslinking of a hydroxyl-group-containing acrylic polymer to be present on at least one side of polyester film.

Patent Reference No. 2 describes a hot-melt adhesive resin film having excellent adhesive force, there being no delamination of respective layers relative to the object to which it is bonded, and having good endurance even when evaluated under demanding endurance conditions, that is characterized in that a first adhesive layer, a first intermediate layer, a heat-resistant substrate layer, a second intermediate layer, and a second adhesive layer are laminated in this order, wherein the first adhesive layer and the second adhesive layer contain acid-modified polyolefin resin. At the Working Examples therein, the adhesiveness of a film employing a cyclic olefin polymer or a methylpentene polymer at a substrate layer is evaluated after being allowed to stand for 1000 hours under dry conditions at 120° C.

Patent Reference No. 1: Japanese Patent Application Publication Kokai No. H2[1990]-248435 Patent Reference No. 2: International Patent Application Publication No. 2017/037525

DISCLOSURE OF THE INVENTION

Problem to be Solved by Invention

However, none of these have any appreciation whatsoever with regard to the adhesiveness between a heat seal layer and a substrate under steam conditions.

An embodiment in accordance with the present disclosure was conceived in light of such background art, it being an object thereof to provide a laminate having excellent adhesiveness between a heat seal layer and a substrate under steam conditions.

Means for Solving Problem

Means for solving the foregoing problems include the following modes.

1. A laminate having an easy-to-adhere layer on at least one face of a resin substrate film, and having a heat seal layer on a face, of at least one of the easy-to-adhere layer or layers, which is on a side opposite the resin substrate film therefrom, the laminate being such that a glass transition temperature of a resin that forms the resin substrate film is not less than 90° C.;

the easy-to-adhere layer is formed from easy-to-adhere agent containing 100 parts by weight of acrylic polymer resin and 3-40 parts by weight of crosslinking agent;

the acrylic polymer resin has methylol groups present therein in an amount that is 7-20 mol % of all monomer units that make up this polymer;

the crosslinking agent is at least one crosslinking agent selected from among the group consisting of oxazoline-type crosslinking agent and glycidylamine-type crosslinking agent; and the heat seal layer is a polyolefin-type heat seal layer, thickness of which is less than 300 μm.

2. The laminate according to claim 1 wherein the crosslinking agent is the oxazoline-type crosslinking agent, content of which is 10-40 parts by weight.

3. The laminate according to claim 1 wherein the crosslinking agent is the glycidylamine-type crosslinking agent, content of which is 3-35 parts by weight.

4. The laminate according to claim 3 wherein the easy-to-adhere agent further contains Compound A indicated by Formula (II);

Formula (II) is given by

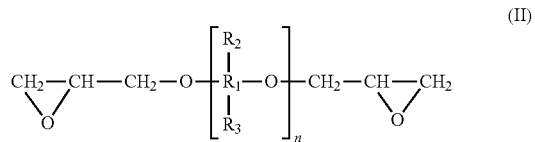

(II)

wherein n at Formula (II) is an integer that is 1-10;

wherein $R_1$ indicates the main chain in the molecular structure at Formula (II); furthermore, where a plurality of glycidyl groups are present within the molecular structure of Compound A, the longest chain that connects two glycidyl groups is taken to be the main chain;

wherein $R_1$ is a hydrocarbon group having 2-10 carbon atoms, the product of the number of carbon atoms at $R_1$ and n being 3-20; and wherein $R_2$ and $R_3$ are each a hydrogen atom, hydroxy group, hydrocarbon group having 1-8 carbon atoms, or glycidyl ether group.

BENEFIT OF THE INVENTION

In accordance with an embodiment of the present disclosure, it is possible to provide a laminate having excellent adhesiveness between heat seal layer(s) and substrate under steam conditions.

BEST MODE OF CARRYING OUT INVENTION

Where a numeric range is indicated through use of "-" in the present disclosure, this means the range inclusive of the lower limit and the upper limit that are indicated by the values appearing before and after the "-". Where numeric range(s) are indicated in stepwise fashion in the present disclosure, upper limit(s) and/or lower limit(s) of one numeric range may be replaced by upper limit(s) and/or lower limit(s) of another numeric range that is indicated in stepwise fashion. Furthermore, where numeric range(s) are indicated in the present disclosure, values indicated as upper limit(s) and/or lower limit(s) of numeric range(s) may be replaced by value(s) indicated in the Working Examples.

In the present disclosure, combination of two or more preferred modes constitutes a more preferred mode.

Laminate

A laminate in accordance with the present disclosure has an easy-to-adhere layer on at least one face of a resin substrate film, and has a heat seal layer on the face, of at least one of the easy-to-adhere layer(s) provided at the resin substrate film, which is on the side opposite the resin substrate film therefrom. More specifically, constitutions such as the following may be cited: a constitution having an easy-to-adhere layer on one face of a resin substrate film, and having a heat seal layer on that face of the easy-to-adhere layer which is on the side opposite the resin substrate film therefrom; a constitution having easy-to-adhere layers on both faces of a resin substrate film, and having a heat seal layer on that face of one of the easy-to-adhere layers which is on the side opposite the resin substrate film therefrom; and a constitution having easy-to-adhere layers on both faces of a resin substrate film, each of the two easy-to-adhere layers respectively having a heat seal layer on that face thereof which is on the side opposite the resin substrate film therefrom.

The respective constituents that make up the laminate in accordance with the present disclosure are described below.

Resin Substrate Film

In accordance with the present disclosure, resin substrate film is employed as the substrate in the laminate having a heat seal layer. As the resin, while this may be selected in correspondence to the properties desired for the substrate in the context of the use which is the purpose to which it will be put, to improve adhesiveness with respect to the heat seal layer under steam conditions, the glass transition temperature (Tg) thereof is not less than 90° C., is preferably not less than 95° C., and is more preferably not less than 100° C. Accordingly, it is preferred that it be thermoplastic resin.

As preferred resins, polyester (polyethylene terephthalate, polybutylene terephthalate, polyethylene naphthalate, and the like), polyolefin (polypropylene and the like), polyphenylene (polyphenylene ether, polyphenylene sulfide, and the like), polystyrene (syndiotactic polystyrene and the like), polyvinylidene fluoride, polyimide, polyether, polyarylate, polycarbonate, polysulfone, aromatic polyether ketone (polyether ether ketone and the like), and the like may be cited. Furthermore, mixtures of such resins may be employed. As mixtures, mixtures of polyphenylene ether with polypropylene, polybutylene terephthalate, and/or syndiotactic polystyrene may be cited in particular.

To obtain the strength necessary for it to serve as substrate in laminate having heat seal layer(s), it is sufficient that thickness of the resin substrate film used in the present disclosure be not less than 20 μm, it is preferred that this be not less than 25 μm, more preferred that this be not less than 35 μm, still more preferred that this be not less than 45 μm; moreover, it is preferred that this be not greater than 300 μm, more preferred that this be not greater than 270 μm, and still more preferred that this be not greater than 250 μm. Alternatively, it might be not greater than 150 μm or not greater than 130 μm.

In accordance with the present disclosure, from the standpoint of more easily obtaining a glass transition temperature as described above, and/or from the standpoint of satisfactory mechanical properties and the like as well as ease of handling and so forth, it is preferred that the resin be polyester; i.e., it is preferred that the resin substrate film be polyester film.

Polyester Film

In accordance with the present disclosure, the polyester that makes up the polyester film is such that the glass transition temperature thereof is not less than 90° C. By causing the glass transition temperature thereof to be not less than 90° C., it will be possible to maintain excellent adhesiveness with respect to heat seal layer(s) under steam conditions. For example, polyethylene terephthalate or polybutylene terephthalate (it being possible to employ these after increasing Tg thereof as a result, for example, of copolymerization, use of carbodiimide or other such additive, or the like), polyethylene naphthalate, and the like may be cited.

As specific examples of such polyester, polyethylene naphthalate may be favorably cited. As polyethylene naphthalate, polyethylene-2,6-naphthalate or polyethylene-2,7-naphthalate is preferred. While it is preferred that such polyester be a homopolymer, within such ranges as will cause the glass transition temperature thereof to be not less than 90° C., other monomer(s) may be copolymerized therewith to produce a copolymer. As copolymer component, for example, oxalic acid, adipic acid, phthalic acid, sebacic acid, dodecanecarboxylic acid, isophthalic acid, terephthalic acid, 1,4-cyclohexanedicarboxylic acid, 4,4'-biphenyldicarboxylic acid, phenylindandicarboxylic acid, 2,6-naphthalenedicarboxylic acid (where the main polymer is not polyethylene-2,6-naphthalate), 2,7-naphthalenedicarboxylic acid (where the main polymer is not polyethylene-2,7-naphthalate), tetralindicarboxylic acid, decalindicarboxylic acid, diphenyletherdicarboxylic acid, and other such dicarboxylic acids, p-oxybenzoic acid, p-oxyethoxybenzoic acid, and other such oxycarboxylic acids, or propylene glycol, trimethylene glycol, tetramethylene glycol, hexamethylene glycol, cyclohexane methylene glycol, neopentyl glycol, ethylene oxide adduct of bisphenol sulfone, ethylene oxide adduct of bisphenol A, diethylene glycol, polyethylene oxide glycol, and other such dihydric alcohols, and the like may be favorably used.

Not only may any one of these compounds be used, but it is also the case that any two or more of these may be used. Citable as more preferred thereamong are acid components including isophthalic acid, terephthalic acid, 4,4'-biphenyldicarboxylic acid, 2,6-naphthalenedicarboxylic acid, 2,7-naphthalenedicarboxylic acid, and p-oxybenzoic acid; and glycol components including trimethylene glycol, hexamethylene glycol, neopentyl glycol, and ethylene oxide adduct of bisphenol sulfone.

Of these polyesters, because of their good mechanical properties and steam-resistant characteristics, polyesters consisting mostly of polyethylene-2,6-naphthalate are particularly preferred. Here, "consisting mostly of" indicates that not less than 90 mol %, and preferably not less than 95 mol %, of all of the repeating units in the polyester are ethylene-2,6-naphthalate units.

Film Additives

To the extent that it does not interfere with the object of the present invention, resin substrate film in accordance with present disclosure may contain filler as appropriate as needed for improvement of lubricity and/or other such purpose. As such filler, it is possible to employ those known conventionally as agents for imparting lubricity to polyester film or other such film or sheeting. For example, calcium carbonate, calcium oxide, aluminum oxide, kaolin, silicon oxide, zinc oxide, carbon black, silicon carbide, tin oxide, crosslinked acrylic resin particles, crosslinked polystyrene resin particles, melamine resin particles, crosslinked silicon resin particles, and so forth may be cited. Moreover, coloring agent, antistatic agent, antioxidant, organic glidant, catalyst, and/or the like may be added as appropriate to the resin substrate sheet.

Manufacturing Method

The resin substrate film, and the resin which is employed therein, that are employed in the present disclosure are capable of being manufactured in accordance with methods known conventionally to those of skill in the art.

In the description that follows, by way of example, polyester is employed as resin. Note that other resins may be used to obtain resin substrate films by referring to the following.

Polyester Manufacturing Method

The polyester of the present disclosure may be obtained by conventionally known methods; for example, a method in which a glycol and terephthalic acid, naphthalenedicarboxylic acid, or other such carboxylic acid are reacted to directly obtain a polyester having a low degree of polymerization; a method in which a glycol and a transesterification catalyst is used to react a lower alkyl ester of a dicarboxylic acid, following which polymerization is carried out in the presence of a polymerization catalyst; or the like.

As the aforementioned transesterification catalyst, it is possible to employ any one compound, or any two more compounds, containing sodium, potassium, magnesium, calcium, zinc, strontium, titanium, zirconium, manganese, and/or cobalt. As polymerization catalyst, antimony trioxide, antimony pentoxide, and other such antimony compounds, germanium compounds, representative of which is germanium dioxide, tetraethyl titanate, tetrapropyl titanate, and tetraphenyl titanate, as well as partially hydrolyzed versions thereof, titanyl ammonium oxalate, potassium titanyl oxalate, titanium tris acetylacetonate, and other such titanium compounds may be cited.

Where polymerization is carried out by way of the transesterification reaction, trimethyl phosphate, triethyl phosphate, tri-n-butyl phosphate, orthophosphoric acid, or other such phosphorous compound may be added before the polymerization reaction is carried out for the purpose of deactivating the transesterification catalyst, in which case it is preferred from the standpoint of the thermal stability of the polyester that the content of elemental phosphorus within the polyester be 20-100 ppmw.

Moreover, following melt polymerization, the polyester may be made into chips, and solid-state polymerization may be carried out with application of heat under reduced pressure or while subjected to nitrogen or other such inert gas flow.

It is preferred that the intrinsic viscosity (35° C.; orthochlorophenol) of the polyester that makes up the film be not less than 0.40 dl/g, and more preferred that this be 0.40-0.90 dl/g. If intrinsic viscosity is too low, there will be a tendency for it to become more likely that operations could be interrupted. But if this is too high, due to the tendency for melt viscosity to increase, there will be a tendency for melt extrusion to become difficult, and there will be a tendency for polymerization time to increase. Note that where intrinsic viscosity is too low, there will also be a tendency for hydrolytic resistance to decrease.

Film Manufacturing Method

The polyester film employed in the present disclosure may be obtained, for example, by carrying out melt extrusion to cause the foregoing polyester to be made into sheet form, using a casting drum to cool and solidify this to produce unstretched film, causing this unstretched film to be stretched in the long direction (i.e., the film forming machine axial direction; also referred to as the longitudinal direction or MD) once, or two or more times, at Tg–(Tg+60°) C so that total stretching corresponds to a factor of 3×–6×, causing this to be stretched in the transverse direction (i.e., the direction perpendicular to the film forming machine axial direction and to the thickness direction; also referred to as the lateral direction or TD) once, or two or more times, at Tg–(Tg+60°) C so that total stretching corresponds to a factor of 3×–5×, where necessary further carrying out heat treatment for 1-60 seconds at (Tm–80)–(Tm–20°) C, and where necessary further carrying out reheat treatment while causing contraction by 0%-20% in the transverse direction at a temperature which is 10°-20° C. lower than the heat treatment temperature. Here, note that Tg indicates the glass transition temperature of the polyester which serves as the raw material for the film, and Tm indicates melting point. Furthermore, the foregoing stretching may be sequential biaxial stretching or may be simultaneous biaxial stretching.

Easy-To-Adhere Layer

The easy-to-adhere layer of the present disclosure is formed from easy-to-adhere agent containing 100 parts by weight of acrylic polymer resin and 3-40 parts by weight of crosslinking agent. In addition, the foregoing acrylic polymer resin is such that methylol groups are present in an amount that is 7-20 mol % of all of the monomer units that make up this polymer, and the foregoing crosslinking agent is at least one species selected from among the group consisting of oxazoline-type crosslinking agent and glycidylamine-type crosslinking agent.

It is preferred that thickness of the easy-to-adhere layer be within a range that is 0.001-1 μm. It is more preferred that thickness of the easy-to-adhere layer be not greater than 0.5 μm, and still more preferred that this be not greater than 0.2 jam; and it is preferred that this be not less than 0.01 μm, and still more preferred that this be not less than 0.02 μm. If thickness of the easy-to-adhere layer is too small, there will be a tendency for there to be reduced effect with respect to improvement of the adhesiveness of the easy-to-adhere layer; conversely, if it is too thick, there will be a tendency for cohesive failure to be more likely to occur within the easy-to-adhere layer, and there will be a tendency for there to be reduced effect with respect to improvement of the adhesiveness with respect to the heat seal layer(s) under steam conditions.

Acrylic Polymer Resin

The acrylic polymer resin may be obtained by polymerization of acrylic acid ester-type monomer as primary component. As such acrylic acid ester-type monomer, for example, methyl (meth)acrylate, ethyl (meth)acrylate, butyl (meth)acrylate, ethyl crotonate, glycidyl (meth)acrylate, 2-hydroxyethyl (meth)acrylate, 2-ethylhexyl (meth)acrylate, and so forth may be cited. Note that "(meth)acrylate" indicates acrylate and/or methacrylate.

Methylol Group

The acrylic polymer resin of the present disclosure is such that methylol groups are present in an amount that is 7-20 mol % of all (100 mol %) of the monomer units that make up this polymer. When the methylol group content within the polymer is within such range, it will be possible to attain excellent adhesiveness with respect to heat seal layer(s) under steam conditions. If content is too low, it is thought that because there may be too few functional groups available to contribute to improvement of adhesiveness that this could be what causes decrease in adhesiveness; and if content is too high, it is thought that because flexibility of the easy-to-adhere layer may be reduced that this could be what causes decrease in adhesiveness. From such standpoint, it is preferred that methylol groups be present in an amount that is not less than 8 mol % of all (100 mol %) of the monomer units that make up the polymer, more preferred that this be not less than 9 mol % thereof, and still more preferred that this be not less than 10 mol % thereof; and it is preferred that this be not greater than 17 mol % thereof, more preferred that this be not greater than 14 mol % thereof, and still more preferred that this be not greater than 11 mol % thereof.

It is preferred that such methylol groups be methylolamino groups. Content ranges thereof are identical to the foregoing content ranges given for methylol groups. Note that what is referred to as a methylolamino group is that which has a N—CH$_2$—OH constitution, it being possible for the nitrogen atom to be from an amide bond.

With respect to how methylol groups are introduced into the acrylic polymer resin, copolymerization with monomer(s) having methylol group(s) may be cited. As monomers in which there is one or more methylol group present per molecule, N-methylol(meth)acrylamide, butoxy N-methylol(meth)acrylamide, and dimethylol(meth)acrylamide may be cited. N-methylol(meth)acrylamide is preferred; N-methylolacrylamide is particularly preferred. The number of methylol groups present per molecule might, for example, be two or less. Here, "(meth)acrylamide" indicates acrylamide and/or methacrylamide.

To the extent that it does not interfere with the object of the present invention, besides the acrylic acid ester-type monomer serving as primary component and the aforementioned monomer(s) containing methylol group(s), the acrylic polymer resin of the present disclosure may contain other monomer(s) such as are capable of vinyl polymerization therewith. The amount thereof might, for example, be not greater than 10 mol % of all (100 mol %) of the monomer units that make up the polymer.

Crosslinking Agent

As described above, the easy-to-adhere layer of the present disclosure is formed from easy-to-adhere agent containing 100 parts by weight of acrylic polymer resin and 3-40 parts by weight of crosslinking agent.

Where the amount of crosslinking agent that is added is below the lower limit, while it may be possible to attain adhesiveness initially, there will be dramatic decrease in adhesiveness under steam conditions. And where the amount of crosslinking agent that is added is above the upper limit, there is a tendency for the easy-to-adhere layer to harden and become brittle, and for this to cause decrease in adhesiveness. From such standpoint, it is preferred that crosslinking agent be present in an amount that is not less than 4 parts by weight, and more preferred that this be not less than 5 parts by weight; and it is preferred that this be not greater than 35 parts by weight, and more preferred that this be not greater than 30 by weight.

In addition, such crosslinking agent is a crosslinking agent that is at least one species selected from among the group consisting of oxazoline-type crosslinking agent and glycidylamine-type crosslinking agent.

Oxazoline-Type Crosslinking Agent

It is preferred that the oxazoline-type crosslinking agent used in the present disclosure be an oxazoline group-containing polymer, it being possible for this to be prepared from addition-polymerization-capable oxazoline group-containing monomer alone, or by polymerization of same with other monomer(s).

As addition-polymerization-capable oxazoline group-containing monomer, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and so forth may be cited, it being possible for any one of these to be used alone, or for a mixture of any two or more of these to be used. Of these, 2-isopropenyl-2-oxazoline is favorable, being easily available industrially.

As other monomer(s), there is no limitation with respect thereto so long as they are monomer(s) capable of being copolymerized with addition-polymerization-capable oxazoline group-containing monomer(s), it being possible, for example, to cite alkyl acrylate, alkyl methacrylate (as such alkyl group(s), methyl group, ethyl group, n-propyl group, isopropyl group, n-butyl group, isobutyl group, t-butyl group, 2-ethylhexyl group, cyclohexyl group, and so forth may be cited), and other such acrylic acid esters or methacrylic acid esters; acrylic acid, methacrylic acid, itaconic acid, maleic acid, fumaric acid, crotonic acid, styrenesulfonic acid, as well as salts thereof (sodium salts, potassium salts, ammonium salts, tertiary amine salts, and so forth), and other such unsaturated carboxylic acids; acrylonitrile, methacrylonitrile, and other such unsaturated nitriles; acrylamide, methacrylamide, N-alkylacrylamide, N-alkylmethacrylamide, N,N-dialkylacrylamide, N,N-dialkylmethacrylamide (as such alkyl group(s), methyl group, ethyl group, n-propyl group, isopropyl group, n-butyl group, isobutyl group, t-butyl group, 2-ethylhexyl group, cyclohexyl group, and so forth may be cited), and other such unsaturated amides; vinyl acetate, vinyl propionate, and other such vinyl esters; methyl vinyl ether, ethyl vinyl ether, and other such vinyl ethers; ethylene, propylene, and other such α-olefins; vinyl chloride, vinylidene chloride, vinyl fluoride, and other such halogen-containing α,β-unsaturated monomers; styrene, α-methylstyrene, and other such α,β-unsaturated aromatic monomers, and so forth. Any one of these monomers may be used alone, or any two or more thereof may be used in combination.

Furthermore, it is preferred that polyalkylene oxide group-containing monomer unit(s) be present therein. As monomer(s) for forming such unit(s), for example, those which are such that polyalkylene oxide group(s) have been added to ester portion(s) of methacrylic acid or acrylic acid may be cited. As polyalkylene oxide group, for example, polymethylene oxide, polyethylene oxide, polypropylene oxide, and polybutylene oxide may be cited. Polyethylene oxide is particularly preferred. It is preferred that the number of polyalkylene oxide chain repeating units be 4-50, more preferred that this be 5-20, and still more preferred that this be 8-15.

The oxazoline group-containing polymer may be obtained by using conventionally known polymerization method(s) to carry out polymerization using the foregoing monomer(s). For example, any of various methods such as the emulsion polymerization method (a method in which polymerization catalyst, water, surface active agent, and monomer are batch-mixed to carry out polymerization), the monomer drip method, the multi-step method, the pre-emulsion method, and the like may be utilized. Conventionally known polymerization catalyst(s) may be used. For example, hydrogen peroxide, potassium persulfate, 2,2'-azobis(2-aminodipropane) dihydrochloride, and other such ordinary radical polymerization initiators may be cited. Furthermore, as surface active agent, conventionally known anionic, nonionic, cationic, and amphoteric surface active agents as well as reactive surface active agents may be cited. Polymerization temperature is ordinarily 00-100° C., 50°-80° C. being preferred. Furthermore, polymerization time is ordinarily 1-10 hours.

Where the polymer contains oxazoline group(s), it is preferred that content of oxazoline group(s) within such polymer be 10-70 mol %, and more preferred that this be 20-50 mol %. This will make it possible to better improve the effect of addition of crosslinking agent at the easy-to-adhere layer, and to achieve increased effect with respect to improvement of adhesiveness under steam conditions.

Where oxazoline-type crosslinking agent is employed, this is present in an amount that, for every 100 parts by weight of acrylic polymer resin, is not less than 3 parts by weight, is preferably not less than 10 parts by weight, more preferably is not less than 20 parts by weight, and still more preferably is not less than 25 parts by weight; moreover, this is not greater than 40 parts by weight, is preferably not greater than 35 parts by weight, more preferably is not greater than 32 parts by weight, and preferably is not greater than 30 parts by weight.

Glycidylamine-Type Crosslinking Agent

The glycidylamine-type crosslinking agent used in the present disclosure is/are compound(s) having at least one tertiary amino group and two or more glycidyl groups per molecule. Here, such glycidyl groups are bonded to amino group(s).

The glycidylamine-type crosslinking agent contains a crosslinking group indicated by Formula (I), below, it being preferred that this be compound having a structure in which a nitrogen atom (—N<) is bonded directly or by way of a methylene group (—CH$_2$—) to a carbon atom making up an aromatic ring or alicyclic structure.

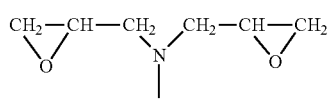

Here, there is no particular limitation with respect to what is meant by an aromatic ring, it being possible, for example, to cite benzene ring, naphthalene ring, anthracene ring, phenanthrene ring, naphthacene ring, pentacene ring, pyrene ring, anthraquinone ring, and so forth. Furthermore, there is no particular limitation with respect to what is meant by an alicyclic structure, it being possible, for example, to cite cyclopropane, cyclobutane, cyclopentane, cyclohexane, cycloheptane, cyclooctane, cyclononane, cyclodecane, cycloundecane, cyclododecane, cyclopropene, cyclobutene, cyclopentene, cyclohexene, cycloheptene, cyclooctene, bicycloundecane and decahydronaphthalene, norbornene and norbornadiene, cubane, basketane, housane, and so forth.

As the specific structure of the glycidylamine-type crosslinking agent used in the present disclosure, the following may be cited.

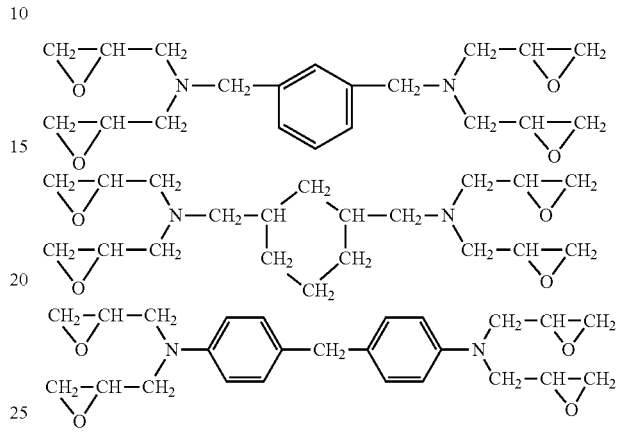

Furthermore, those which are commercially available may be used; for example, MY720 (product name; manufactured by Japan Ciba Geigy; N,N,N,N-tetraglycidyl-4,4'-diaminodiphenylmethane), MY722 (product name; manufactured by Japan Ciba Geigy; N,N,N,N-tetraglycidyl-3,3'-dimethyl-4,4'-diaminodiphenylmethane), ELM-120 (product name; manufactured by Sumitomo Chemical Co., Ltd.), ELM-100 (product name; manufactured by Sumitomo Chemical Co., Ltd.), TETRAD-X (product name; manufactured by Mitsubishi Gas Chemical Company, Inc.; N,N,N,N-tetraglycidyl m-xylylenediamine; epoxy equivalent 101), TETRAD-C (product name; manufactured by Mitsubishi Gas Chemical Company, Inc.; 1,3-bis(N,N-diglycidylaminomethyl)cyclohexane; epoxy equivalent 101), and so forth may be cited. Of these, TETRAD-X and TETRAD-C are examples in which a nitrogen atom is bonded by way of a methylene group to a benzene ring at Formula (I).

Where glycidylamine-type crosslinking agent is employed, this is present in an amount that, for every 100 parts by weight of acrylic polymer resin, is not less than 3 parts by weight, is preferably not less than 4 parts by weight, and more preferably is not less than 5 parts by weight; moreover, this is not greater than 40 parts by weight, is preferably not greater than 35 parts by weight, more preferably is not greater than 32 parts by weight, and still more preferably is not greater than 30 parts by weight.

Other Crosslinking Agents

Where glycidylamine-type crosslinking agent is employed in the present disclosure, it is preferred that this be used in combination with other crosslinking agent(s) in the form of Compound A indicated by Formula (II), below.

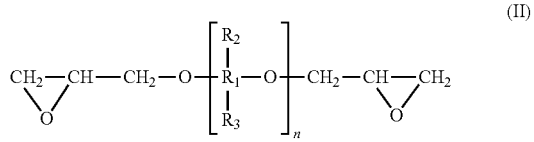

At Formula (II), n is an integer that is 1-10. $R_1$ indicates the main chain in the molecular structure at Formula (II); where a plurality of glycidyl groups are present within the molecular structure of Compound A, the longest chain that connects two glycidyl groups is taken to be the main chain. $R_1$ is a hydrocarbon group having 2-10 carbon atoms, the product of the number of carbon atoms at $R_1$ and n being 3-20. $R_2$ and $R_3$ are each a hydrogen atom, hydroxy group, hydrocarbon group having 1-8 carbon atoms, or glycidyl ether group. When the product of the number of carbon atoms at $R_1$ and n is in the aforementioned range, it will be possible to achieve increased effect with respect to improvement of adhesiveness under steam conditions. Conversely, outside of the aforementioned range, there will be a tendency for coated layer(s) to be more likely to become fragile, and there will be a tendency for there to be decreased effect with respect to improvement of adhesiveness under steam conditions. From such standpoint, it is preferred that the product of the number of carbon atoms at $R_1$ and n be 3-24, and more preferred that this be 3-20. Furthermore, to facilitate achievement thereof, n is preferably 1-10, and more preferably 3-10; and the number of carbon atoms at $R_1$ is preferably 2-10, and more preferably 2-8.

As such other crosslinking agents having the constitution indicated by Formula (II), above, for example, neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether, polytetramethylene glycol diglycidyl ether, trimethylolpropane polyglycidyl ether, glycerol polyglycidyl ether, polyglycerin polyglycidyl ether, sorbitol-type polyglycidyl ethers, and so forth may be cited.

For every 100 parts by weight of glycidylamine-type crosslinking agent, Compound A may be used in an amount that is 15-45 parts by weight, preferably 20-40 parts by weight, and more preferably 23-37 parts by weight. This will make it possible to achieve increased effect with respect to improvement of adhesiveness under steam conditions.

Other Additives

To form easy-to-adhere layer(s), it is preferred that the easy-to-adhere agent used in the present disclosure be used in the form of an aqueous solution, aqueous dispersion, emulsion, or other such aqueous liquid coating. Furthermore, where necessary, component(s) other than the aforementioned components—e.g., filler, antistatic agent, wax, coloring agent, surface active agent, and/or the like—may be added.

Formation of Easy-To-Adhere Layer

There is no particular limitation with respect to the method used to form the easy-to-adhere layer of the present disclosure, it being possible for lamination to be employed or for coating to be employed. With respect to coating, this may be extruded resin coating or it may be molten resin coating. In the context of such operations, note that the raw materials for formation of easy-to-adhere layer(s) are collectively referred to as easy-to-adhere agent. Formation methods in which a liquid coating(s) (where easy-to-adhere layer(s) are formed as a result of coating, the liquid coating(s) for performing this are referred to as easy-to-adhere agent) is/are used to carry out coating to form the easy-to-adhere layer(s) are particularly preferred.

The solids concentration of the liquid coating is ordinarily 1-20 wt %, and it is more preferred that this be 1-10 wt %. If the fractional percentage thereof is less than 1 wt %, there will be a tendency for paintability with respect to the film to be inadequate; conversely, above 20 wt %, there is a tendency for stability of the liquid coating and/or external appearance of the coating to worsen.

While coating of the liquid coating onto the film may be carried out at any desired stage, it is preferred that this be carried out at the film formation process, and more preferred that coating of the film be carried out prior to completion of oriented crystallization thereof. Here, where prior to completion of oriented crystallization of the film is said, this should be understood to include unstretched film, uniaxially oriented film produced by causing unstretched film to be oriented in one of either the longitudinal direction or the lateral direction, film that has been oriented by stretching in both the longitudinal direction and the lateral direction but at low stretching factor(s) (biaxially stretched film as it exists prior to final restretching in the longitudinal direction and/or lateral direction and completion of oriented crystallization of the film), and so forth. Thereamong, it is preferred that unstretched film or uniaxially stretched film that has been oriented in one direction be coated with aqueous liquid coating having the aforementioned composition, and that while in this state this be made to undergo longitudinal stretching and/or lateral stretching as well as heat-setting.

When causing the film to be coated with the liquid coating, as pretreatment for improving coating characteristics, it is preferred that the film surface be made to undergo corona surface treatment, flame treatment, plasma treatment, or other such physical treatment; or that the liquid coating be such that, together with the respective components that make up the coated layer(s), surface active agent(s) be used in combination therewith that are chemically inactive with respect thereto. Such surface active agent(s) are such as will promote paintability of the film by the liquid coating, it being possible to cite, for example, polyoxyethylene alkyl phenyl ether, polyoxyethylene-fatty acid ester, sorbitan fatty acid ester, glycerin fatty acid ester, fatty acid metal soap, alkyl sulfate, alkyl sulfonate, alkyl sulfosuccinate, and other such anionic and nonionic surface active agents. It is preferred that surface active agent be present in an amount that is 1-10 wt % of the solids content within the liquid coating for forming the coated layer(s). Within this range, it will be possible cause surface tension of the liquid coating to be 40 mN/m or less, and it will be possible to prevent poor wetting thereof by the liquid coating.

As coating method, any desired known method may be employed as the method of application thereof. For example, any among roll coating, gravure coating, roll brushing, spray coating, air knife coating, impregnation, curtain coating, and so forth may be employed alone or in combination.

Heat Seal Layer

The heat seal layer(s) of the present disclosure are polyolefin-type heat seal layer(s). Thereamong, those that contain modified polyolefin which contains polypropylene are preferred.

As polyolefin resin used in heat seal layer(s), for example, homopolymers and copolymers of olefins having 2-8 carbon atoms, and copolymers of olefins having 2-8 carbon atoms with monomer(s), may be cited. More specifically, for example, high-density polyethylene (HDPE), low-density polyethylene (LDPE), linear low-density polyethylene resin, and other such polyethylene, polypropylene, polyisobutylene, poly(1-butene), poly-4-methylpentene, polyvinylcyclohexane, polystyrene, poly(p-methylstyrene), poly(α-methyl styrene), ethylene/propylene block copolymers, ethylene/propylene random copolymers, ethylene/butene-1 copolymers, ethylene/4-methyl-1-pentene copolymers, ethylene/hexene copolymers, and other such α-olefin copolymers, ethylene/vinyl acetate copolymers, ethylene/acrylic acid copolymers, ethylene/methyl methacrylate copolymers, ethylene/vinyl acetate/methyl methacrylate copolymers, ionomer resins, and so forth may be cited. Moreover, it is also possible use chlorinated polyolefins obtained by chlorination of any of these polyolefins.

As described above, it is possible to use any of various types of polyolefin resins in heat seal layer(s); in particular, this may be modified polyolefin resin(s) in which, for example, carboxyl group(s), hydroxyl group(s), and/or any other among various types of functional groups is/are introduced to polyolefin resin. Moreover, because it will further improve adhesiveness with respect to metal, such modified polyolefin resin(s) may be modified polyolefin resin(s) having an acid value of 1-200 mg KOH/g (also referred to as acid-modified polyolefin resin(s)) and/or modified polyolefin resin(s) having a hydroxyl value of 1-200 mg KOH/g (also referred to as hydroxyl-modified polyolefin resin(s)).

An acid-modified polyolefin resin is a polyolefin resin having carboxyl group(s) and/or carboxylic anhydride group(s) within the molecule, which may be synthesized by causing a polyolefin to be modified by unsaturated carboxyl acid(s) and/or derivative(s) thereof. As method for carrying out such modification, graft modification and/or copolymerization be employed.

An acid-modified polyolefin resin is graft-modified polyolefin in which at least one polymerizable ethylenically unsaturated carboxylic acid or derivative thereof has been made to undergo graft modification or copolymerization with the pre-modification polyolefin resin. As pre-modification polyolefin resin, the aforementioned polyolefin resins may be cited, propylene homopolymers, copolymers of propylene and α-olefins, ethylene homopolymers, copolymers of ethylene and α-olefins, and so forth being preferred thereamong. Any one of these may be used alone, or any two or more of these may be used in combination. As acid-modified polyolefin resin, for example, maleic anhydride-modified polypropylene, ethylene-(meth)acrylic acid copolymer, ethylene-acrylic ester-maleic anhydride terpolymer, or ethylene-methacrylic ester-maleic anhydride terpolymer, may be cited. More specifically, there are those which are commercially available as "MODIC" manufactured by Mitsubishi Chemical Corporation, "ADMER" and "UNISTOLE" manufactured by Mitsui Chemicals, Inc., "TOYO-TAC" manufactured by Toyokasei Co., Ltd., "UMEX" manufactured by Sanyo Chemical, Ltd., "REXPEARL EEA" and "REXPEARL ET" manufactured by Japan Polyethylene Corporation, "Primacol" manufactured by Dow Chemical, "Nucrel" manufactured by Du Pont-Mitsui Polychemicals Co. Ltd., and "BONDINE" manufactured by Arkema.

A hydroxyl-modified polyolefin resin is a polyolefin resin having hydroxyl group(s) within the molecule, which may be synthesized by causing a polyolefin to undergo graft modification or copolymerization with hydroxyl-group-containing (meth)acrylic acid ester or hydroxyl-group-containing vinyl ether, described below. As the aforementioned hydroxyl-group-containing (meth)acrylic acid ester, hydroxyethyl (meth)acrylate, hydroxypropyl (meth)acrylate, glycerol (meth)acrylate, lactone-modified hydroxyethyl (meth)acrylate, polyethylene glycol (meth)acrylate, polypropylene glycol (meth)acrylate, and so forth may be cited; and as the aforementioned hydroxyl-group-containing vinyl ether, 2-hydroxyethyl vinyl ether, diethylene glycol monovinyl ether, 4-hydroxybutyl vinyl ether, and so forth may be cited.

Thickness of the heat seal layer in the present disclosure is less than 300 μm. Where this is too thick, there will be a tendency for adhesiveness between the heat seal layer and the easy-to-adhere layer to decrease. From such standpoint, it is preferred that this be not greater than 250 μm, more preferred that this be not greater than 200 μm, still more preferred that this be not greater than 150 μm, and particularly preferred that this be not greater than 100 μm. Furthermore, as there is a tendency for this to not easily function as a heat seal layer if it is too thin, it is preferred for example that this be not less than 10 μm, more preferred that this be not less than 20 μm, and particularly preferred that this be not less than 30 μm.

As specific examples of techniques for causing heat seal layer(s) to be provided on easy-to-adhere layer(s), the extruded lamination method in which molten resin is extruded in sheet-like fashion from a die onto an easy-to-adhere layer, the dry lamination method in which resin that has undergone processing so as to be in the shape of a film is laminated over an easy-to-adhere layer, the coating method in which a resin solution is coated on an easy-to-adhere layer and allowed to dry, and so forth may be cited.

WORKING EXAMPLES

Although the present disclosure is described in detail below in terms of working examples, it should be understood that the present disclosure is not limited to these working examples. Note that values for the various properties were measured in accordance with the methods given below.

(1) Glass Transition Temperature and Melting Point 10 mg of resin substrate film was sealed within an aluminum measuring pan, this was mounted in a differential scanning calorimeter (DSC Model Q100 manufactured by TA Instruments), temperature was increased from 25° C. to 3000 C at a rate of 20° C./minute and was held at 300° C. for 5 minutes, following which this was removed therefrom and quenched by cooling on a metal plate. This pan was again mounted in the differential scanning calorimeter, temperature was increased from 25° C. at a rate of 20° C./minute to measure glass transition temperature (Tg: ° C.) and melting point (Tm: ° C.). Note that the extrapolated onset temperature was taken to be the glass transition temperature.

(2) Initial Adhesiveness

Samples 10 mm in width and 150 mm in length were cut therefrom, the end portion of the heat seal layer of which adhesiveness was to be measured was delaminated to prepare a notch therein, and a tensile test apparatus (Tensilon Model UCT-100 manufactured by Orientec Co., Ltd.) was used to carry out 1800 peeling at a peel rate of 100 mm/min in accordance with JIS-C2151. Measurement was carried out 5 times, the average of the maximum value measured during each run being taken to be the peel strength, which was evaluated according to the following criteria.

A: Peel strength was greater than or equal to 15N

B: Peel strength was greater than or equal to 5N but less than 15N

C: Peel strength was less than 5N (3) Adhesiveness Under Steam Conditions (120° C.×48 Hours)

Except for the fact that the samples used were such that samples were immersed in water at 120° C. for 48 hours, and were thereafter allowed to stand and dry at room temperature for 24 hours, this was carried out in similar fashion as at (2), above, evaluation being carried out according the following criteria.
A: Peel strength was greater than or equal to 15N
B: Peel strength was greater than or equal to 5N but less than 15N
C: Peel strength was less than 5N
(4) Thickness
Thicknesses of the resin substrate film, easy-to-adhere layer(s), and heat seal layer(s) were measured as follows.
(4-1) Resin Substrate Film and Heat Seal Layer
Triangular film samples were cut therefrom and secured within embedding capsules, following which embedding was carried out using epoxy resin. A microtome (ULTRA-CUT-S) was used to obtain thin-film sections from the sectional face parallel to the longitudinal direction from the embedded film samples, following which an optical microscope was used to carry out observation and photography, thicknesses of the respective layers being measured based on photographs.
(4-2) Easy-To-Adhere Layer
Triangular film samples were cut therefrom and secured within embedding capsules, following which embedding was carried out using epoxy resin. A microtome (ULTRA-CUT-S) was used to obtain thin-film sections of thickness 50 nm from the sectional face parallel to the longitudinal direction from the embedded film samples, following which a transmission electron microscope was used to carry out observation and photography at an acceleration voltage of 100 kV, thickness of the easy-to-adhere layer was measured at 10 locations based on photographs, and average thickness was calculated.
(5) Methylol Group
The acrylic polymer resin was air-dried, 50 mg of the dry matter obtained was dissolved in 0.4 cc of DMSO-d6, and $^{13}$C-NMR was measured at 80° C. and 30000 integrations with a 500 MHz NMR (ECA-500 manufactured by JEOL RESONANCE).
A peak in the vicinity of 65 ppm was determined to be the C of the methylol group, and a peak in the vicinity of 45 ppm was determined to be the C (a carbon) to which the ester bonds and/or amide bonds of the main chain were bonded, methylol group content within the molecule being calculated from the ratio of the areas thereunder. For example, taking the case where the area under the peak in the vicinity of 65 ppm has a relative area of 5, and the area under the peak in the vicinity of 45 ppm has a relative area of 50, it would be determined that 10 mol % of methylol groups are present for every 100 mol % of monomer(s) that make up the polymer.

Working Example 1

As resin, polyethylene-2,6-naphthalate (obtained using manganese acetate tetrahydrate as transesterification catalyst and using antimony trioxide as polymerization catalyst; indicated as PEN in the Table) having an intrinsic viscosity of 0.60 dl/g (35° C.; orthochlorophenol) was used, this was dried for 6 hours in a dryer at 170° C. and was thereafter loaded into an extruder, where it was melt kneaded at a melt temperature of 300° C., and extruded by way of a die slit at 300° C., following which this was cooled and solidified on a casting drum set to a surface temperature of 25° C. to produce unstretched film.
This unstretched film was guided to a set of rolls heated to 140° C., was stretched in the long direction by a factor of 3.5×, and was cooled at a set of rolls at 25° C.
Next, the roll coater method was used to cause one face of film that had undergone longitudinal stretching to be coated with easy-to-adhere agent corresponding to the fractional content indicated at TABLE 1 (solids concentration 4 wt %; additionally containing 8 parts by weight of surface active agent—product name Sannonic SS-70; manufactured by Sanyo Chemical, Ltd.—for every 100 parts by weight of all solids content other than surface active agent) such that thickness of the easy-to-adhere layer on the film that was ultimately obtained was 50 nm.
Next, with the two ends of the film retained with clips, this was guided to a tenter, where stretching was carried out by a factor of 3.5× in the lateral direction in an atmosphere heated to 135° C. Thereafter, within the tenter, heat-setting was carried out for 40 seconds at 220° C., and this was made to undergo 1% relaxation in the transverse direction at 220° C., following which this uniformly annealed, being cooled to room temperature, to obtain biaxially stretched film of thickness 200 μm.
Next, a heat seal layer was formed over the easy-to-adhere layer of the film that was obtained. As heat seal agent for forming the heat seal layer, ADMER QE-840 (manufactured by Mitsui Chemicals, Inc.) was used, this being formed using the extruded lamination method. Thickness of the heat seal layer that was obtained was 50 m.

Working Examples 2-9; Comparative Examples 2-7

Except for the fact that the easy-to-adhere agent was varied as indicated at TABLE 1, these were carried out in similar fashion as at Working Example 1 to obtain biaxially stretched film and form a heat seal layer thereon.
At Comparative Example 7, thickness of the heat seal layer was 300 μm.

Comparative Example 1

As resin, polyethylene terephthalate (obtained using manganese acetate tetrahydrate as transesterification catalyst and using antimony trioxide as polymerization catalyst; indicated as PET in the Table) having an intrinsic viscosity of 0.64 dl/g (35° C.; orthochlorophenol) was used, this was dried for 3 hours in a dryer at 170° C. and was thereafter loaded into an extruder, where it was melt kneaded at a melt temperature of 280° C., and extruded by way of a die slit at 280° C., following which this was cooled and solidified on a casting drum set to a surface temperature of 25° C. to produce unstretched film.
This unstretched film was guided to a set of rolls heated to 95° C., was stretched in the long direction by a factor of 3.5×, and was cooled at a set of rolls at 25° C.
Next, the roll coater method was used to cause one face of film that had undergone longitudinal stretching to be coated with easy-to-adhere agent corresponding to the fractional content indicated at TABLE 1 (solids concentration 4 wt %; additionally containing 8 parts by weight of surface active agent—product name Sannonic SS-70; manufactured by Sanyo Chemical, Ltd.—for every 100 parts by weight of all solids content other than surface active agent) such that thickness of the easy-to-adhere layer on the film that was ultimately obtained was 50 nm.
Next, with the two ends of the film retained with clips, this was guided to a tenter, where stretching was carried out by a factor of 3.5× in the lateral direction in an atmosphere heated to 110° C. Thereafter, within the tenter, heat-setting was carried out for 40 seconds at 220° C., and this was made to undergo 1% relaxation in the transverse direction at 190°

C., following which this uniformly annealed, being cooled to room temperature, to obtain biaxially stretched film of thickness 200 μm.

Next, a heat seal layer was formed over the easy-to-adhere layer of the film that was obtained. As heat seal agent for forming the heat seal layer, ADMER QE-840 (manufactured by Mitsui Chemicals, Inc.) was used, this being formed using the extruded lamination method. Thickness of the heat seal layer that was obtained was 50 μm.

Manufacturing Example 1: Acrylic Polymer Resin

Manufacture was carried out as follows in accordance with the method described in the Manufacturing Examples of Japanese Patent Application Publication Kokai No. S63 [1988]-37167. To with, 3 parts of sodium lauryl sulfonate serving as surface active agent and 181 parts of deionized water were placed in a four-necked flask, the temperature of this was increased to 60° C. in a nitrogen gas stream, 0.2 part of sodium hydrogen nitrite and 0.5 part of ammonium persulfate serving as polymerization initiator were then added thereto, and monomers in the form of a mixture of 63.4 parts of methyl methacrylate, 27.4 parts of ethyl acrylate, and 9.2 parts of N-methylolacrylamide were then further dripped thereinto while the temperature of the solution was adjusted so as to be 60°-70° C. over the course of 3 hours. Following the conclusion of dripping, this same temperature range was maintained for 2 hours as the reaction was allowed to continue while agitation was carried out, this then being cooled to obtain an aqueous dispersion of an acrylic polymer resin in which methylol groups were present in an amount that was 10 mol %.

Note that methylol group content was adjusted by means of the amount of N-methylolacrylamide that was added. When the amount of N-methylolacrylamide that was added was decreased, the amount of methyl methacrylate that was added was increased by a corresponding amount; when the amount of N-methylolacrylamide that was added was increased, the amount of methyl methacrylate that was added was decreased by a corresponding amount.

Manufacturing Example 2

The following were used:

product name TETRAD-X, manufactured by Mitsubishi Gas Chemical Company, Inc., serving as glycidylamine-type crosslinking agent;

product name Epocros WS-700, manufactured by Nippon Shokubai Co., Ltd., serving as oxazoline-type crosslinking agent (polymer containing 20-50 mol % oxazoline groups within the polymer);

product name CARBODILITE SV-02, manufactured by Nisshinbo Chemical Inc., serving as carbodiimide-type crosslinking agent;

product name Denacol EX-313, manufactured by Nagase ChemteX Corporation, serving as other crosslinking agent (glycerol polyglycidyl ether).

TABLE 1

| | Resin substrate film | | Fractional content within solids content of easy-to-adhere agent (parts by weight) | | | Acrylic polymer resin Methylol group content (mol %) | Crosslinking agent Type | Film properties | |
|---|---|---|---|---|---|---|---|---|---|
| | | | Acrylic | | Other | | | Adhesiveness | |
| | Resin | Glass transition temperature Tg (° C.) | polymer resin | Crosslinking agent | crosslinking agent | | | Initial Adhesiveness | under steam conditions |
| Working Example 1 | PEN | 120 | 100 | 3 | 1 | 10 | Glycidylamine | A | B |
| Working Example 2 | PEN | 120 | 100 | 5 | 2 | 10 | Glycidylamine | A | A |
| Working Example 3 | PEN | 120 | 100 | 10 | 3 | 10 | Glycidylamine | A | A |
| Working Example 4 | PEN | 120 | 100 | 30 | 10 | 10 | Glycidylamine | A | A |
| Working Example 5 | PEN | 120 | 100 | 40 | 13 | 10 | Glycidylamine | B | B |
| Working Example 6 | PEN | 120 | 100 | 10 | 3 | 7 | Glycidylamine | A | B |
| Working Example 7 | PEN | 120 | 100 | 10 | 3 | 20 | Glycidylamine | B | B |
| Working Example 8 | PEN | 120 | 100 | 30 | 0 | 10 | Oxazoline | A | A |
| Working Example 9 | PEN | 120 | 100 | 10 | 0 | 10 | Glycidylamine | B | B |
| Comparative Example 1 | PET | 80 | 100 | 10 | 3 | 10 | Glycidylamine | A | C |
| Comparative Example 2 | PEN | 120 | 100 | 0 | 0 | 10 | Glycidylamine | B | C |
| Comparative Example 3 | PEN | 120 | 100 | 50 | 17 | 10 | Glycidylamine | C | C |
| Comparative Example 4 | PEN | 120 | 100 | 10 | 3 | 5 | Glycidylamine | B | C |
| Comparative Example 5 | PEN | 120 | 100 | 10 | 3 | 30 | Glycidylamine | C | C |
| Comparative Example 6 | PEN | 120 | 100 | 10 | 0 | 10 | Carbodiimide | C | C |
| Comparative Example 7 | PEN | 120 | 100 | 10 | 3 | 10 | Glycidylamine | C | C |

INDUSTRIAL UTILITY

Because initial adhesiveness thereof is high, and because adhesiveness under steam conditions thereof is also high, a laminate in accordance with the present disclosure, besides being capable of being employed in the usual manner, is also capable of being employed as an excellent heat seal film in applications in which it will be exposed to steam conditions, the industrial utility of which is high.

The invention claimed is:

1. A laminate having an easy-to-adhere layer on at least one face of a resin substrate film, and having a heat seal layer on a face, of at least one of the easy-to-adhere layer or layers, which is on a side opposite the resin substrate film therefrom, the laminate being such that
   a glass transition temperature of a resin that forms the resin substrate film is not less than 90° C.;
   the easy-to-adhere layer is formed from easy-to-adhere agent containing 100 parts by weight of acrylic polymer resin and 3-40 parts by weight of crosslinking agent;
   the acrylic polymer resin has methylol groups present therein in an amount that is 7-20 mol % of all monomer units that make up this polymer;
   the crosslinking agent is at least one crosslinking agent selected from among the group consisting of oxazoline-type crosslinking agent and glycidylamine-type crosslinking agent; and
   the heat seal layer is a polyolefin-type heat seal layer, thickness of which is less than 300 μm.

2. The laminate according to claim 1 wherein the crosslinking agent is the oxazoline-type crosslinking agent, content of which is 10-40 parts by weight.

3. The laminate according to claim 1 wherein the crosslinking agent is the glycidylamine-type crosslinking agent, content of which is 3-35 parts by weight.

4. The laminate according to claim 3 wherein the easy-to-adhere agent further contains Compound A indicated by Formula (II);
   wherein Formula (II) is given by

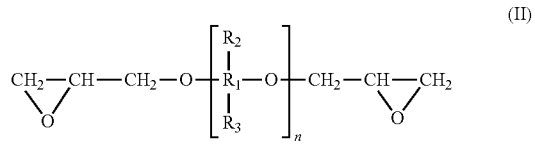

wherein n at Formula (II) is an integer that is 1-10;
wherein $R_1$ indicates the main chain in the molecular structure at Formula (II); furthermore, where a plurality of glycidyl groups are present within the molecular structure of Compound A, the longest chain that connects two glycidyl groups is taken to be the main chain;
wherein $R_1$ is a hydrocarbon group having 2-10 carbon atoms, the product of the number of carbon atoms at $R_1$ and n being 3-20; and
wherein $R_2$ and $R_3$ are each a hydrogen atom, hydroxy group, hydrocarbon group having 1-8 carbon atoms, or glycidyl ether group.

* * * * *